United States Patent

Blodgett et al.

[11] Patent Number: 6,104,517
[45] Date of Patent: Aug. 15, 2000

[54] SECURE COMMUNICATIONS SYSTEM

[75] Inventors: Jerry A. Blodgett, Annandale, Va.;
Raymond A. Patten, Oxon Hill, Md.

[73] Assignee: The United States of America as represented by the Secretary of the Navy, Washington, D.C.

[21] Appl. No.: 05/535,335

[22] Filed: Dec. 26, 1974

[51] Int. Cl.$^7$ .......................... H04B 10/04; H04B 10/00; H04B 10/06

[52] U.S. Cl. ............................ 359/183; 359/168; 359/190

[58] Field of Search ........................ 250/199; 356/106 R, 356/345; 359/182, 183, 193, 190, 168

[56] References Cited

U.S. PATENT DOCUMENTS 3,508,060  4/1970  Boykin .................................... 250/199
3,755,676  8/1973  Kinsel .................................... 250/199

OTHER PUBLICATIONS

Skolnik; *Radar Handbook*; McGraw–Hill; 1970; pp. 37–14, 15, 43; TK 6575 S5r.
Born & Wolf; *Principles of Optics*; MacMillan Co., 1964; pp. 319, 320; QC 357 B57.

*Primary Examiner*—Stephen C. Buczinski
*Attorney, Agent, or Firm*—Barry A. Edelberg; Charles J. Stockstill

[57] ABSTRACT

A secure communications system which comprises a laser-sending system and a light receiver. The laser light is divided into two beams, one beam is modulated to add the signal thereto, then the beams are recombined and directed to the receiver. The receiver then separates and demodulates the signal.

4 Claims, 1 Drawing Sheet

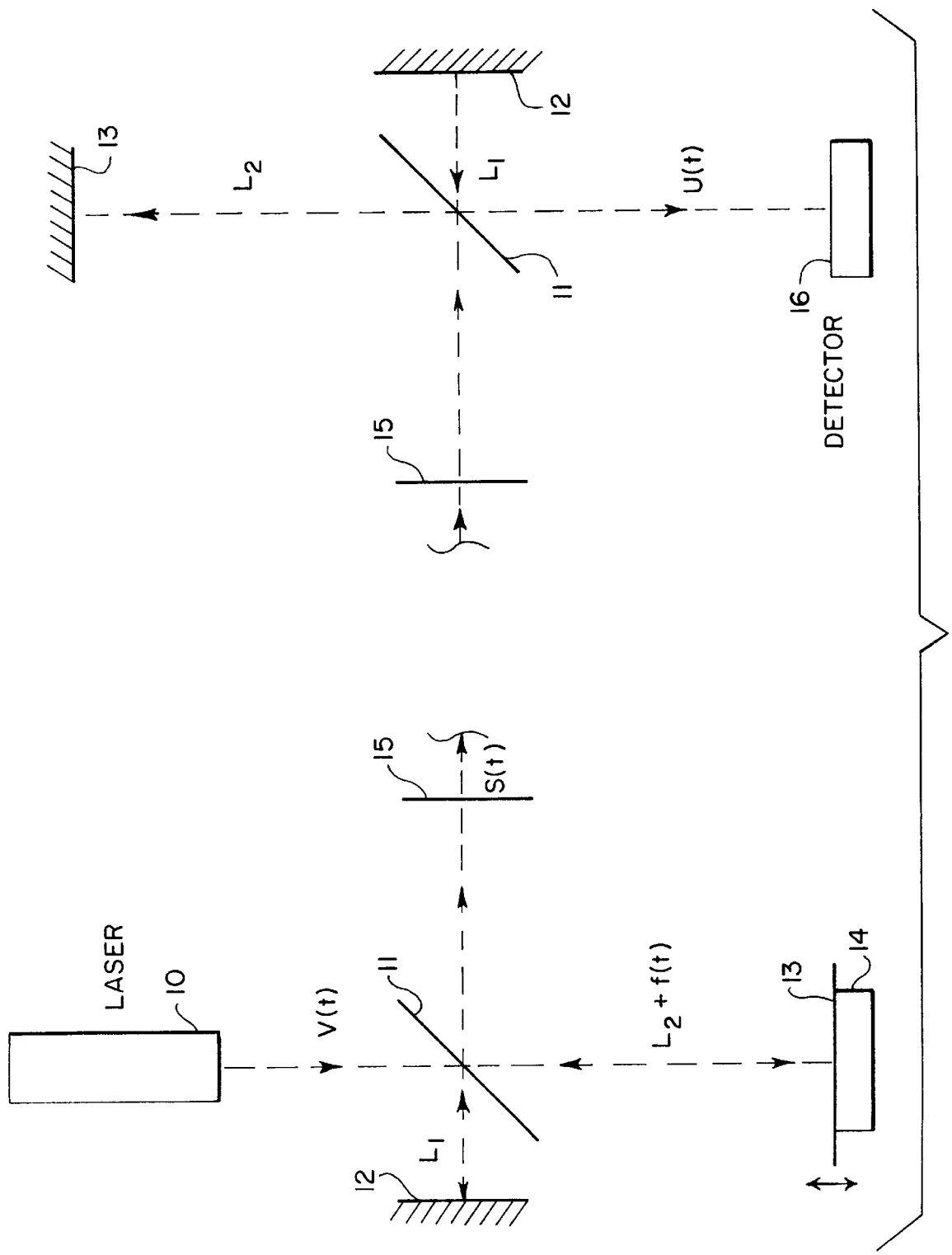

SECURE COMMUNICATIONS SYSTEM

BACKGROUND OF THE INVENTION

This invention relates to optical communications systems and more particularly to systems based on the coherence properties of a continuous wave laser which simultaneously transmits a phase modulated and an unmodulated laser beam.

Heretofore optical communication systems have used light pipes as well as directional beams of light upon which information has been added for transmission. Systems using directional beams have employed very stable lasers for the carrier. These systems operate on the heterodyne principle and are subject to intercept by a system employing a local oscillator to mix with the direct or scattered beam.

SUMMARY OF THE INVENTION

This optical communication system employs a laser with short coherence length. The output from the laser is split into two parts by suitable optics, then the two parts travel different distances in the transmission system. One of the two parts has a varying phase impressed on it which contains the information to be transmitted. On recombination, the two parts can no longer interfere if the path difference is much greater than the coherence length. These two recombined beams are then transmitted through the atmosphere to a receiver. Since the two beams are collinear, both suffer the same atmospheric disturbances. On reception, the beams are allowed to travel different distances before being recombined again. The difference in the two distances is the same as it was at the transmitter subsequent to being split and prior to recombination. At the output of the receiver, interference can then be observed between the portions of each beam which are again coherent. This interference contains the transmitted information and is detected as such. The proposed system uses a relatively broad band (short coherence length) laser for the carrier. For this reason, it is impossible to extract the transmitted information by mixing with a local oscillator. The technique further requires that the scattered radiation be collected from a small region in order to intercept the information.

BRIEF DESCRIPTION OF THE DRAWING

The drawing illustrates a schematic of the optical communication sending and receiving system.

DESCRIPTION OF THE SYSTEM

Now referring to the drawing, there is shown a schematic diagram of the overall system for sending and receiving optical communication. The system includes a NdYAG laser 10 having a wavelength of 1.06 $\mu$m, 250 mw (cw) output. The laser output is directed onto an unequal arm Michelson interferometer, which includes a beam splitter 11 that reflects a portion of the light over a short path onto a fully reflective mirror 12, which reflects the light back through the beam splitter. The other portion of the laser beam passes through the beam splitter onto a vibrating fully reflective mirror 13 which is a longer distance from the beam splitter than mirror 12 and which modulates the beam portion in accordance with information desired to be transmitted. The mirror 13 is mounted onto a piezoelectric modulator 14 having a 1 MHz bandwidth which vibrates the mirror in accordance with information directed into the transducer in accordance with known principles in the direction shown by the arrow.

The fully reflective mirror 13 reflects the modulated light back to the beam splitter, which reflects the light portion therefrom normal with the output of the laser. Since the split beam portions are reflected back to the beam splitter by mirrors 12 and 13, the two portions are recombined into a single beam and directed through a 20 cm diameter lens 15 and transmitted through the atmosphere as a single beam to a receiver system. The single transmitted beam will include the phase modulated portion and the unmodulated portion. As transmitted, the two beams are incoherent and the two beams will not interfere with each other, since the path length difference between the beam splitter 11 and the two mirrors 12 and 13 is much greater than the coherence length of the original laser beam. Thus, the varying phase of the modulated beam is undetectable by normal optical techniques.

The receiver system includes an identical unequal arm Michelson interferometer as in the transmitter where the combined beams pass through an optical lens 15 onto beam splitter 11, which separates the two beams as before, in which the two beams travel the same distances to the fully reflective mirrors 12 and 13 as in the transmitter. The two beams reflected by the mirrors 12 and 13 are recombined on passing back through the beam splitter into a coherent beam. The coherent beam is then directed onto a silicon photodiode detector 16. The information added to the beam at the transmitter is detected as interference in the output of the detector 16.

A technical description of the system is as follows:
The field amplitude for the laser output is given v(t). The coherence length of the laser, $L_c$, is much less than the path difference in the unequal arm interferometer in the transmitter, $$L_c << |L_2 - L_1|.$$

The mirror in arm 2 of the interferometer is modulated some fraction of a wavelength so that the length of the second arm is given by $$l_2(t) = L_2 + f(t)$$

where $|f(t)_{max}|$ is assumed to be a fraction of a wavelength of the light used. The output of the interferometer is then $$S(t) = V\left(t + \frac{L_1}{c}\right) + V\left(t + \frac{L_2}{c} + \frac{f(t)}{c}\right).$$

This beam is then transmitted to the interferometer of the receiver shown on the right in FIG. 1. Again the arms are of unequal length such that the path difference is the same as for the transmitting interferometer. As shown, the arms in both interferometers are identical. The amplitude at the detector of the receiving interferometer is then given by $$U(t) = V\left(t + \frac{L_1}{c}\right) + V\left(t + \frac{L_1}{c}\right) + \frac{L_2}{c} +$$
$$V\left(t + \frac{L_1}{c} + \frac{L_2}{c} + \frac{f(t)}{c}\right) + V\left(t + 2\frac{L_2}{c} + \frac{f(t)}{c}\right).$$

The second and third terms will interfere and will allow the information received to be detected as an amplitude modulation at the detector of the receiving interferometer.

Atmospheric phase modulations of the transmitted beams will not affect the information since both the signal and reference beams traverse the same path and experience the same disturbance.

An additional degree of security in optical communication can be added by incorporating a dispersive medium into the above described path of one of the transmitted beams. The information can then be recovered only if an identical dispersive medium is used in the receiver path. Such a communication system permits virtually a limitless number of "codes" to be used in such communications.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A covert optical communications system which comprises:

a transmission system including a laser source which has a continuous wave output;

an unequal arm Michelson interferometer for splitting the laser output into two beams, in which the difference in the lengths of the arms is greater than the coherence length of the laser source output;

means for modulating one of said two beams;

a receiving system including, an unequal arm Michelson interferometer; and a detector for detecting the light beam transmitted.

2. An optical communication system as claimed in claim 1, in which, said laser is a NdYAG.

3. An optical communication system as claimed in claim 2, where said means for modulating said one beam is a piezoelectric transducer.

4. An optical communication system as claimed in claim 3, in which said detector is a silicon photodiode.

* * * * *